US006459570B1

(12) United States Patent
Buchanan

(10) Patent No.: US 6,459,570 B1
(45) Date of Patent: Oct. 1, 2002

(54) LOAD CENTER INTERIOR PANEL WITH SNAP-IN NEUTRAL

(75) Inventor: Jeffery James Buchanan, Lexington, KY (US)

(73) Assignee: Square D Company, Palatine, IL (US)

(*) Notice: Subject to any disclaimer, the term of this patent is extended or adjusted under 35 U.S.C. 154(b) by 0 days.

(21) Appl. No.: 09/198,424

(22) Filed: Nov. 24, 1998

Related U.S. Application Data

(63) Continuation-in-part of application No. 08/837,966, filed on Apr. 15, 1997, now abandoned.

(51) Int. Cl.[7] .................................................. H02B 1/04

(52) U.S. Cl. ................... 361/648; 174/166 R; 361/637; 361/634; 439/716

(58) Field of Search ................................ 439/460, 574, 439/575, 571–573, 532, 716, 846, 871; 174/68.2, 70 B, 71 B, 72 B, 99 B, 166 R, 166 S; 200/296; 361/627, 634, 636, 637, 639, 640, 641, 644, 648, 652, 823, 825

(56) References Cited

U.S. PATENT DOCUMENTS 2,905,923 A * 9/1959 Hammerly
3,135,572 A * 6/1964 Curtis
3,547,274 A * 12/1970 Sosinski
3,992,074 A * 11/1976 Rymer
4,251,851 A * 2/1981 Diersing et al.
4,536,823 A * 8/1985 Ingram
4,681,378 A * 7/1987 Hellman, III
4,740,865 A * 4/1988 Barner
4,752,107 A * 6/1988 Gunell
4,931,898 A * 6/1990 Cole
4,931,902 A * 6/1990 Cole
5,640,294 A * 6/1997 Caggiano
5,721,667 A * 2/1998 Rose

* cited by examiner

*Primary Examiner*—Gerald Tolin
(74) *Attorney, Agent, or Firm*—David R. Stacey; Larry T. Shrout; Larry I. Golden

(57) ABSTRACT

The present invention provides a support base and neutral base for an interior assembly in an electrical distribution device and a method of assembling the same. The interior assembly having at least one bus bar and neutral bar connecting the electrical distribution device to a circuit having at least one phase. The neutral bar and bus bar having a bottom wall and side walls. The support base includes a generally planar body defining a mounting surface on one face of the body and means for mounting the bus bar on the mounting surface. The support base also includes means for retaining the bottom wall of the neutral bar abutting the mounting surface of the body. The retaining means is manually operated and integrally formed with the mounting surface and has a plurality of projections upstanding from the mounting surface. The projections are adapted to abut the side walls of the neutral bar so as to prevent movement in at least one direction horizontally. The retaining means also has at least one interlocking prong for abutting one or more side walls of the neutral bar so as to prevent movement in the vertical direction and the remaining horizontal directions.

13 Claims, 8 Drawing Sheets

LOAD CENTER INTERIOR PANEL WITH SNAP-IN NEUTRAL

RELATED APPLICATION

The present application is a continuation-in-part of prior application no. 08/837,966, filed Apr. 15, 1997, and now abandoned. The present application adds and claims additional disclosure not presented in the prior applications. Since the present application names an inventor named in the prior application, it constitutes a continuation-in-part of the prior application.

FIELD OF THE INVENTION

The present invention relates to electrical distribution load centers, panelboards, and the like, which have modular interior components providing a more compact design.

BACKGROUND OF THE INVENTION

Load centers distribute power for residential, commercial and light-industrial applications. A load center usually provides a mounting enclosure and incorporates an insulating base to carry an incoming line neutral bar for each phase and a ground bar. Individual circuit breakers are mounted to these devices to protect branch circuits against overload and fault conditions. The interior assembly of the load centers are often constructed with bus bars or projecting lugs to form disconnect contacts for the removable individual circuit breakers.

The need arises to distribute more power through enclosures which are the same size or smaller. This requires increasing the electrical rating of the load center to carry a higher voltage and current density while decreasing the size of the enclosure housing the electrical parts.

Among the problems caused by decreasing the space requirements of a load center is the additional hardware necessary for mounting different types of circuit breakers, neutral bars, bus bars, and other components in the load center. Usually, only one type of circuit breaker will fit with a particular bus bar or other components. Furthermore, mounting screws are used to attach and retain these components to the load center interior. The need arises to assemble load centers with increasingly smaller enclosures providing little room for maneuvering. This requires electrical components which can be assembled without complicated tools, or preferably, without any tools.

Other problems caused by assembling the load center interiors is the quantity of parts that must be tracked, inventoried, and supplied in the field to properly complete the assembly. A reduced part count and less manual labor during assembly would decrease installation time and cost.

Furthermore, the parts for the load center interior must be economical to manufacture. A load center which assembles easier and faster at a comparable cost allows more widespread application.

SUMMARY OF THE INVENTION

Accordingly, the present invention provides an interior assembly for an electrical distribution device. The interior assembly having at least one bus bar and neutral bar connecting the electrical distribution device to a circuit having at least one phase. The neutral bar and bus bar having a bottom wall and side walls. The support base includes a generally planar body defining a mounting surface on one face of the body and means for mounting the bus bar on the mounting surface. The support base also includes means for retaining the bottom wall of the neutral bar abutting the mounting surface of the body. The retaining means is manually operated and integrally formed with the mounting surface and has a plurality of projections upstanding from the mounting surface. The projections are adapted to abut the side walls of the neutral bar so as to prevent movement in at least one direction horizontally. The retaining means also has at least one interlocking prong for abutting one or more side walls of the neutral bar so as to prevent movement in the vertical direction and the remaining horizontal directions.

Another aspect of the present invention is a neutral base for an interior assembly of an electrical distribution device. The interior assembly having a surface for mounting at least one bus bar. The neutral base connects the electrical distribution device to a circuit having at least one phase. The neutral base includes a generally rectangular body having a mounting surface and a neutral bar for making an electrical connection. The neutral bar has a bottom wall for abutting the mounting surface of the body and side walls. Means for retaining the neutral bar abutting the mounting surface of the body is included. The retaining means is manually operated and integrally formed with the body. Means for securing the body to the mounting surface of the interior assembly is also included so that the mounting surface of the body is in the same plane as and abutting the mounting surface of the interior assembly, the securing means being integrally formed with the body.

The present invention also includes an interior assembly of an electrical distribution device assembled by upstanding a plurality of projections from the mounting surface; abutting the side walls of the neutral bar against the projections so as to prevent movement in at least one direction horizontally; upstanding at least one interlocking prong from the mounting surface, each interlocking prong having an undercut between the mounting surface and the end of the prong to define a retaining flange; abutting one or more side walls of the neutral bar with the interlocking prong so as to prevent movement in the vertical direction and the remaining horizontal directions; and, manually inserting without discrete fasteners the neutral bar between the upstanding projections and the interlocking prong to rest on the mounting surface of the interior assembly.

An object of the present invention is to provide a load center interior assembly which reduces the part count, the need for discrete fasteners, and the labor content needed for a completed assembly compared to the prior art.

Another object of the present invention is to provide a load center assembly with modular components such as a neutral bar which assemble with a minimum of tools.

Still another object of the present invention is to provide a load center capable of operating at a comparable voltage and current density having a more compact design.

A further object of the present invention is to provide a load center which is inexpensive to manufacture and accommodates a variety of circuit breaker types and quantities without additional hardware for installation.

Another object of the invention is to provide individual components of a load center assembly such as a neutral bar that have mounting features integrally formed therewith and snap-together to reduce riveting and preening of parts.

Other and further advantages, embodiments, variations and the like will be apparent to those skilled-in-the-art from the present specification taken with the accompanying drawings and appended claims.

BRIEF DESCRIPTION OF THE DRAWINGS

In the drawings, which comprise a portion of this disclosure.

DESCRIPTION OF THE PREFERRED EMBODIMENT

Figure 1:
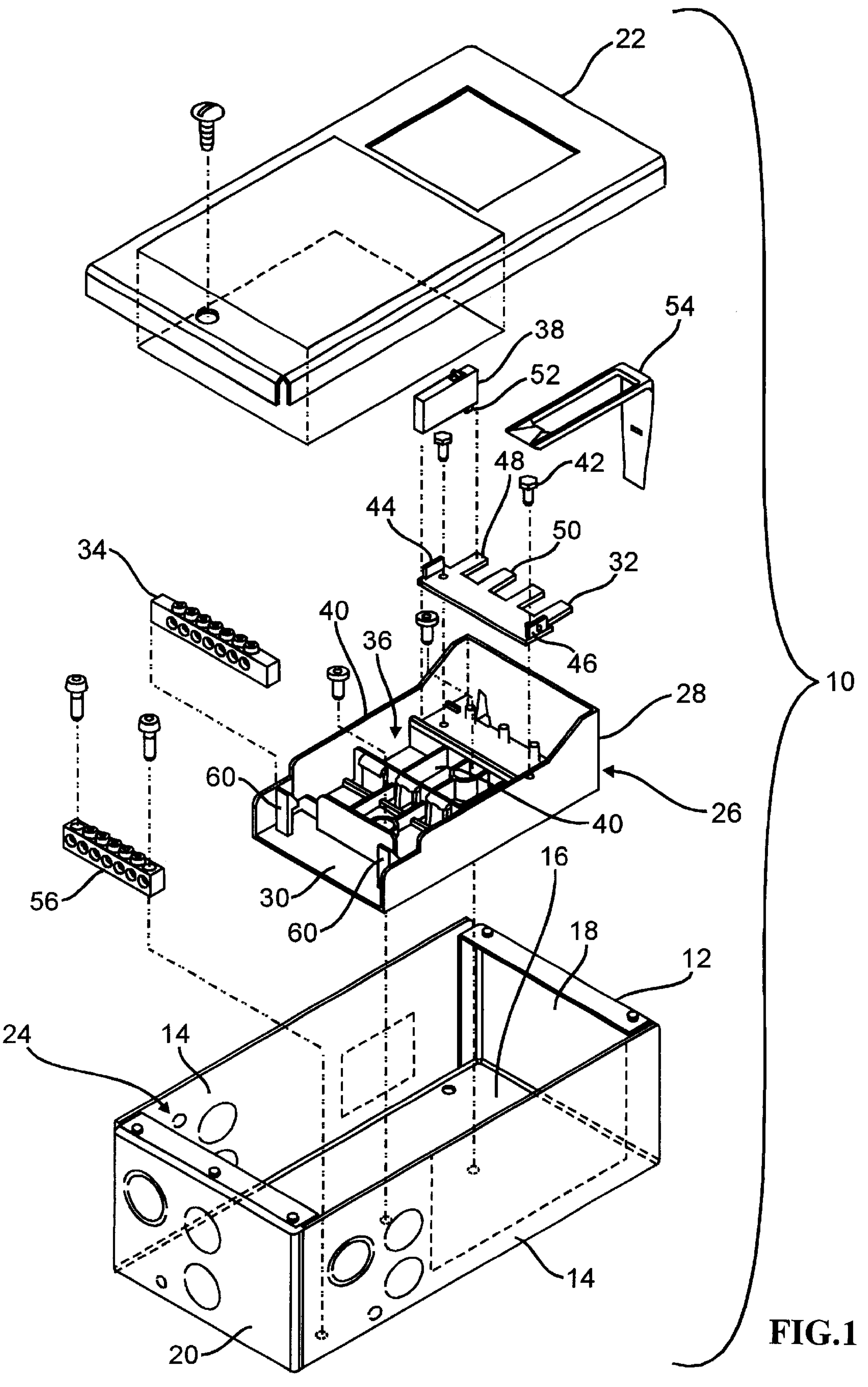
FIG. 1 is an exploded, perspective view of a load center with an interior assembly of the present invention.

Referring now to FIG. 1, a load center for a multi-phase circuit is generally indicated by the reference numeral 10. The load center 10 includes an enclosure 12 defined by sidewalls 14, a backwall 16, a top wall 18, and a bottom wall 20. The load center 10 is enclosed by cover panel 22 which connects to one of the sidewalls 14 to cover the front face 24 of the load center. The enclosure 12 houses an interior assembly of components generally designated as 26.

In a multi-phase circuit, there is an electrical power line to service each respective phase entering the enclosure 12 usually through the side walls 14, backwall 16, and/or bottom wall 20. The load center 10 described and illustrated herein is for a single phase circuit. In accordance with the teachings available in the electrical art, it would be within the skill of one to change the number of phases and modify the invention accordingly.

The present invention generally provides the interior assembly 26 with a support base 28 having a surface 30 for mounting a plurality of components or modules such as bus bar 32 and neutral bar 34. The mounting surface 30 includes a plurality of slots 36 for retention of individual circuit breakers like 38 by means of a snap-on rail, spring tabs, hooks or other fastening means. A plurality of upstanding, elongated, parallel dividers 40 are integrally formed with the mounting surface 30. The dividers 40 separate the adjacent bridging of a conductive member between circuit breaker terminals of different electric potential.

Bus bar 32 is attached to the mounting surface 30 so that it is accessible from the front face 24 of the enclosure 12. The bus bar 32 is attached to the mounting surface 30 by any conventional means such as the fasteners 42 or methods such as heat staking or ultrasonic welding. The bus bar 32 is mounted to the mounting surface near the ends 44 and 46.

The bus bar 32 includes a plurality of integral branch stab portions like 48 and 50, respectively. The present invention is also suitable for use with bus bars that are multi-piece units secured together with fasteners. Each of the circuit breakers 38 is attached to one of the branch stabs 48. Preferably, the circuit breaker 38 uses a pair of spring-biased contact jaws 52 make an electrical connection with the stab 48. The contact jaws flex around each side of the branch stab 48 to retain the branch strap with a spring-like bias in a straddle position. Other mechanical fasteners like screws are also suitable for making the electrical connection between the circuit breaker 38 and the stab 48.

The load center 10 also includes a bracket 54 for retaining a main breaker (not shown) in position. A ground bar 56 is mounted to the backwall 16.

Figure 2:
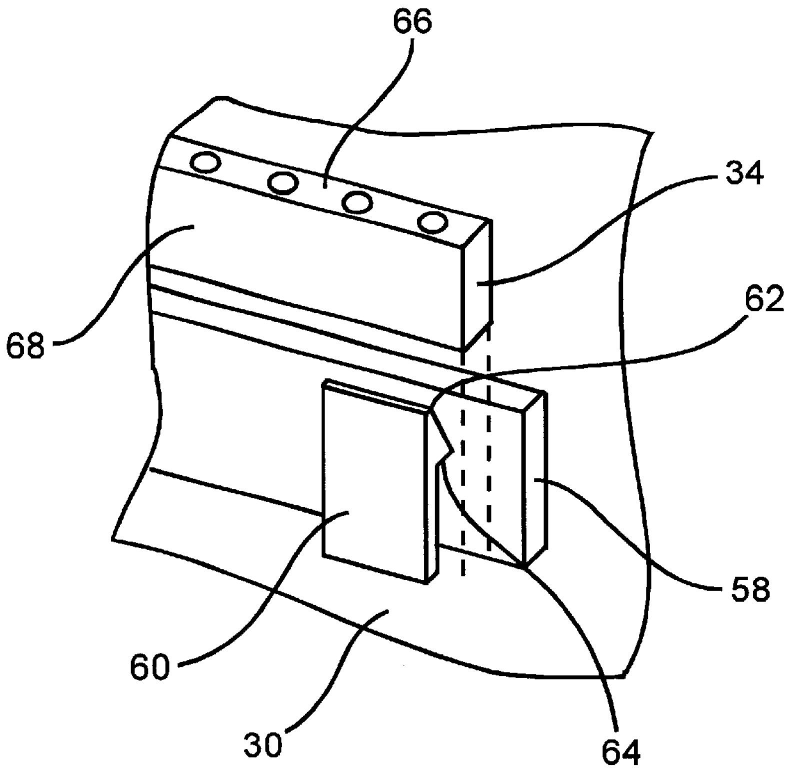
FIG. 2 is an isolated partial perspective view of the embodiment of the snap-fit relationship between the neutral bar and the mounting surface of the load center interior assembly illustrated in FIG. 1.

The bus bar 32 and neutral bar 34 are mounted to the same generally planar mounting surface 30. As particularly illustrated in FIGS. 1 and 2, the neutral bar 34 "snap-fits" onto the mounting surface 30 against an insulating wall 58. The mounting surface 30 supports one or more upstanding prongs 60 rising generally perpendicular to the surface. The end 62 of the prong has an undercut 64 for receiving one of the top edges 66 of the side walls of the neutral bar 34 with the body of the prong abutting the side wall 68 of the neutral bar. Each prong 60 is configured to deform slightly as the neutral bar 34 is lowered onto the mounting surface 30 with the undercut 64 snapping over the top edge 66 when the neutral bar is seated on the mounting surface. Lateral movement of the neutral bar is restrained by an extension of the upstanding walls 40 on the mounting surface. As illustrated, the present invention mounts the neutral bar without using discrete tools.

Alternately, a single prong 60 having sufficient width and being mounted more centrally to the width of the neutral bar 34 can be used to retain the neutral bar in position. Optionally, the prong 60 can have sufficient resiliency to permit the removal of the neutral bar 34 by bending the prong 60 back with an operator's hand or a prying tool.

Figure 3:
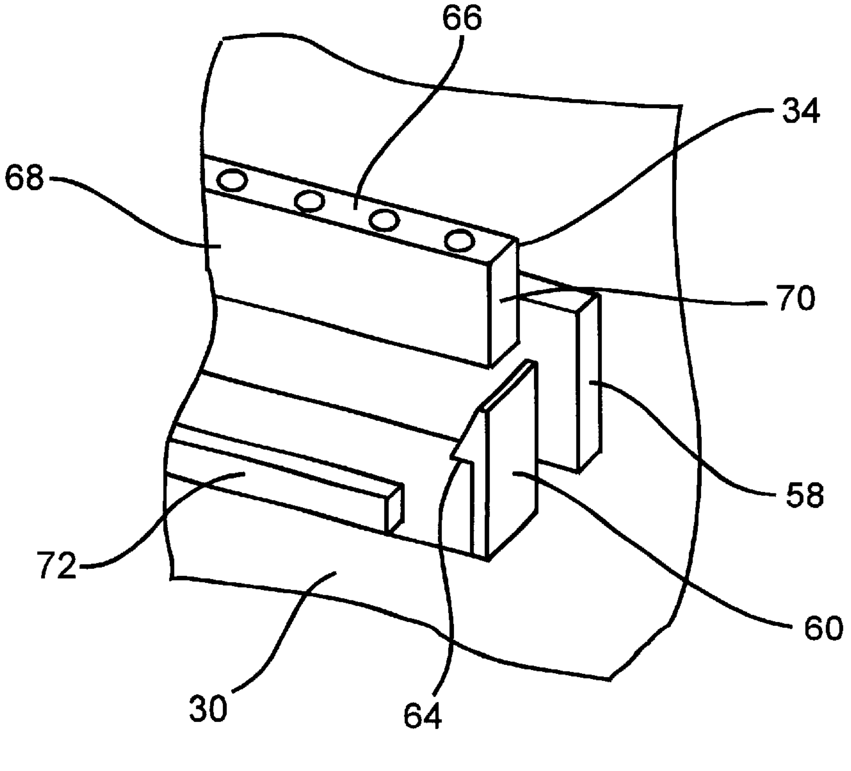
FIG. 3 is an isolated partial perspective view of an alternate embodiment of the snap-fit relationship between the neutral bar and the mounting surface of the load center interior assembly illustrated in FIG. 1.
Figure 4:
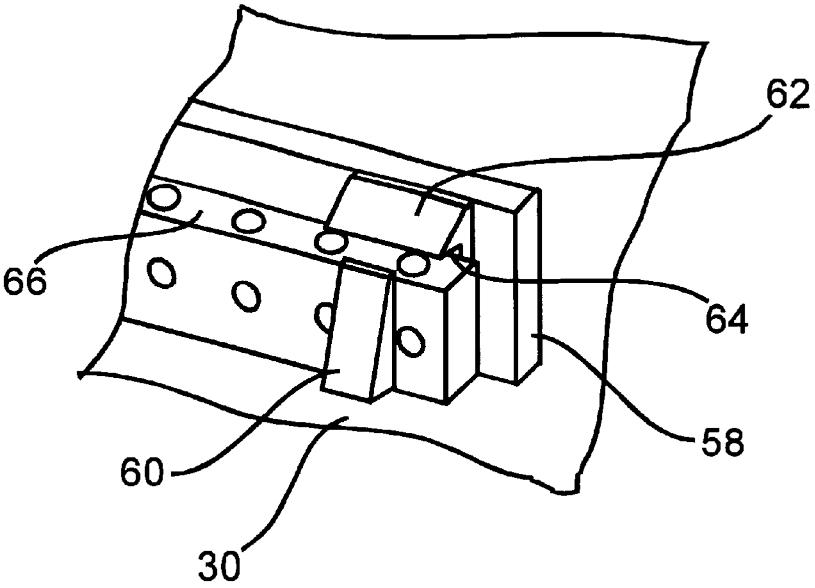
FIG. 4 is an isolated partial perspective view of an alternate embodiment of the snap-fit relationship between the neutral bar and the mounting surface of the load center interior assembly illustrated in FIG. 1.

Other means of reversibly or non-reversibly retaining the neutral bar without discrete tools are included in the present invention. For example, and not for limitation, FIGS. 3 and 4 show other single and multi-piece prong arrangements suitable for retaining the neutral bar 34. FIG. 3 shows how the neutral bar 34 "snap-fits" onto the mounting surface 30 which supports at least one upstanding interlocking prong 60. As described before, the end 62 of the prong has an undercut 64 for receiving one of the top edges 66 of the neutral bar 34. The body of the prong in this embodiment abuts the end wall 70 of the neutral bar. The opposite end of the neutral bar (not shown) can be another prong or simply a retaining wall is provide restraint of lateral movement. The side walls 68 of the neutral bar abut the insulator wall 58 and a retaining wall 72. The prong 60 is configured to deform slightly as the neutral bar 34 is lowered onto the mounting surface 30 with the undercut 64 snapping over the top edge 66 when the neutral bar is seated on the mounting surface.

FIG. 4 shows how the neutral bar 34 "snap-fits" onto the mounting surface 30 which supports a multi-piece prong 60. In this embodiment, the undercut 64 for receiving one of the top edges 66 of the neutral bar 34 is formed by a projection located on the insulator wall 58. As before, the insulator wall 58 abuts one of the side walls 68. The opposite side wall abuts the body of the prong 60 in this embodiment. The body of the prong 60 is configured to deform slightly as the neutral bar 34 is lowered onto the mounting surface 30 with the undercut 64 snapping over the top edge 66 when the neutral bar is seated on the mounting surface.

Figure 6:
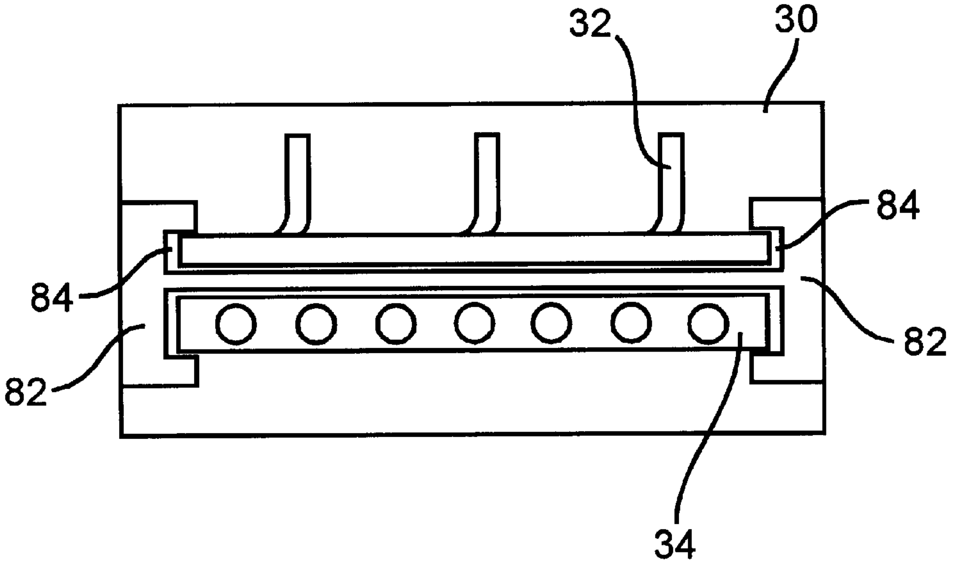
FIG. 6 is an isolated partial perspective view of an alternate embodiment of the configuration between the neutral bar and the bus bar on the mounting surface of the load center interior assembly illustrated in FIG. 1 using a snap-fit relationship.
Figure 5:
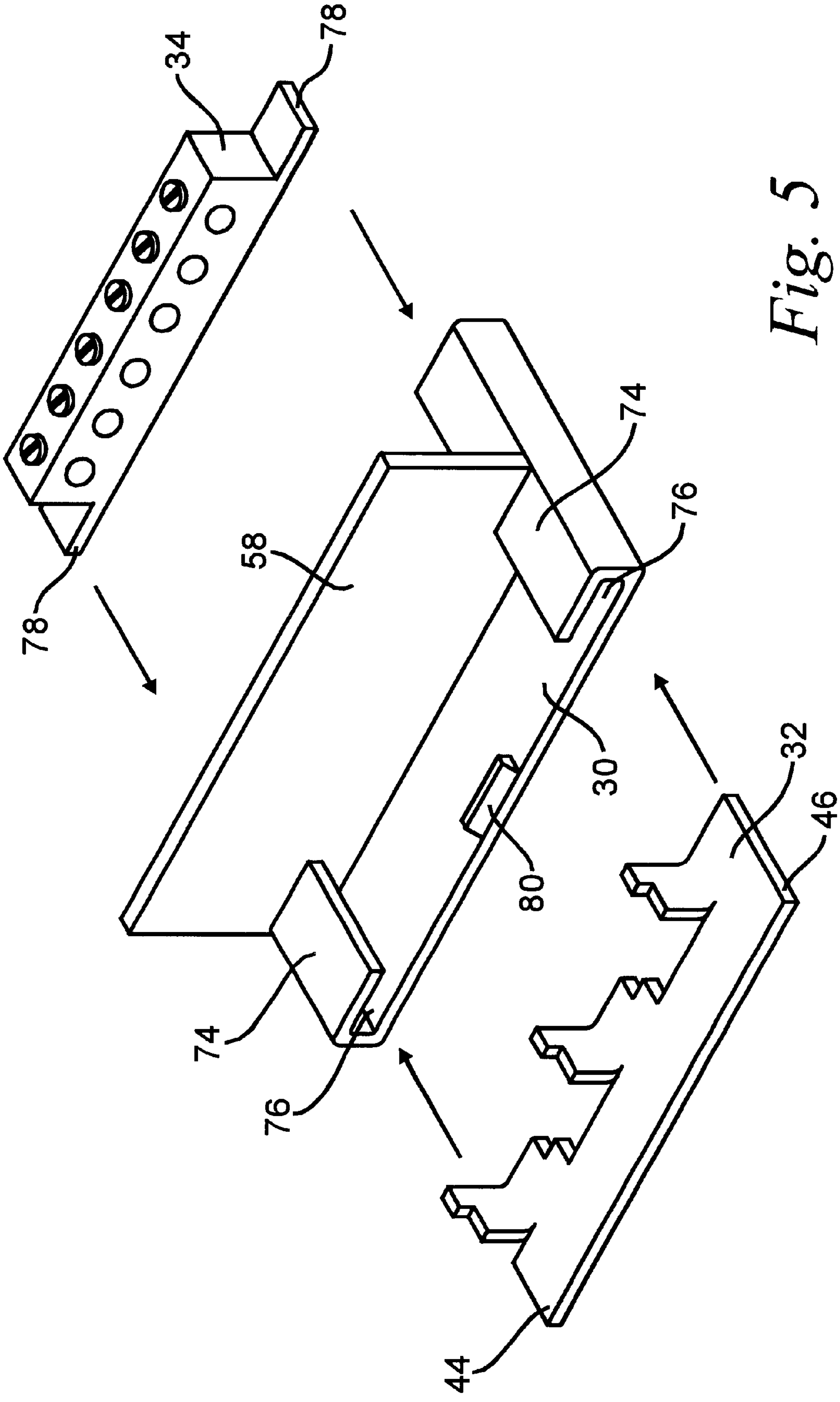
FIG. 5 is an isolated partial perspective view of an alternate embodiment of the configuration between the neutral bar and the bus bar on the mounting surface of the load center interior assembly illustrated in FIG. 1 using a snap-fit relationship.

Other embodiments included in the present invention are illustrated in FIGS. 5 and 6. Specifically, FIG. 5 shows the mounting surface 30 having an integral pair of opposing flanges 74 forming a pair of channels 76 parallel to the mounting surface itself. The ends 44, 46 of the bus bar and the tabs 78 on the bottom of the neutral bar 34 are sized to press-fit into the channels 76. As the bus bar 32 and neutral bar 34 are advanced toward each other, projections 80 deform downwardly allowing each bar to slide over it. Once each bar 32 and 34 clears the projection 80, it moves back to its original shape and abuts the edge of the respective bar to lock each in position. The insulator wall 58 separates the neutral bar 34 and bus bar 32 and can be integrally formed or similarly locked into position with the channels 76. As illustrated, the neutral bar 34 and bus bar 32 are in a back-to-back configuration.

FIG. 6 shows a similar means of retaining the neutral bar and bus bar. Wherein, the mounting surface 30 has an integrally formed, upstanding pair of opposing flanges 82 forming a pair of channels 84 perpendicular to the mounting surface itself. The ends 44, 46 of the bus bar and the tabs 78 on the bottom of the neutral bar 34 are sized to press-fit into the channels 84. As the bus bar 32 and neutral bar 34 are advanced downward to the mounting surface. Once each bar 32 and 34 clears a prong (not shown for clarity) as described in either FIGS. 2-4, the prong moves back to its original shape and abuts the top edge of the respective bar to lock each in position. The insulator wall 58 separates the neutral bar 34 and bus bar 32 and can be integrally formed or similarly locked into position with the channels 84. As illustrated, the neutral bar 34 and bus bar 32 are in an alternate back-to-back configuration.

Figure 7:
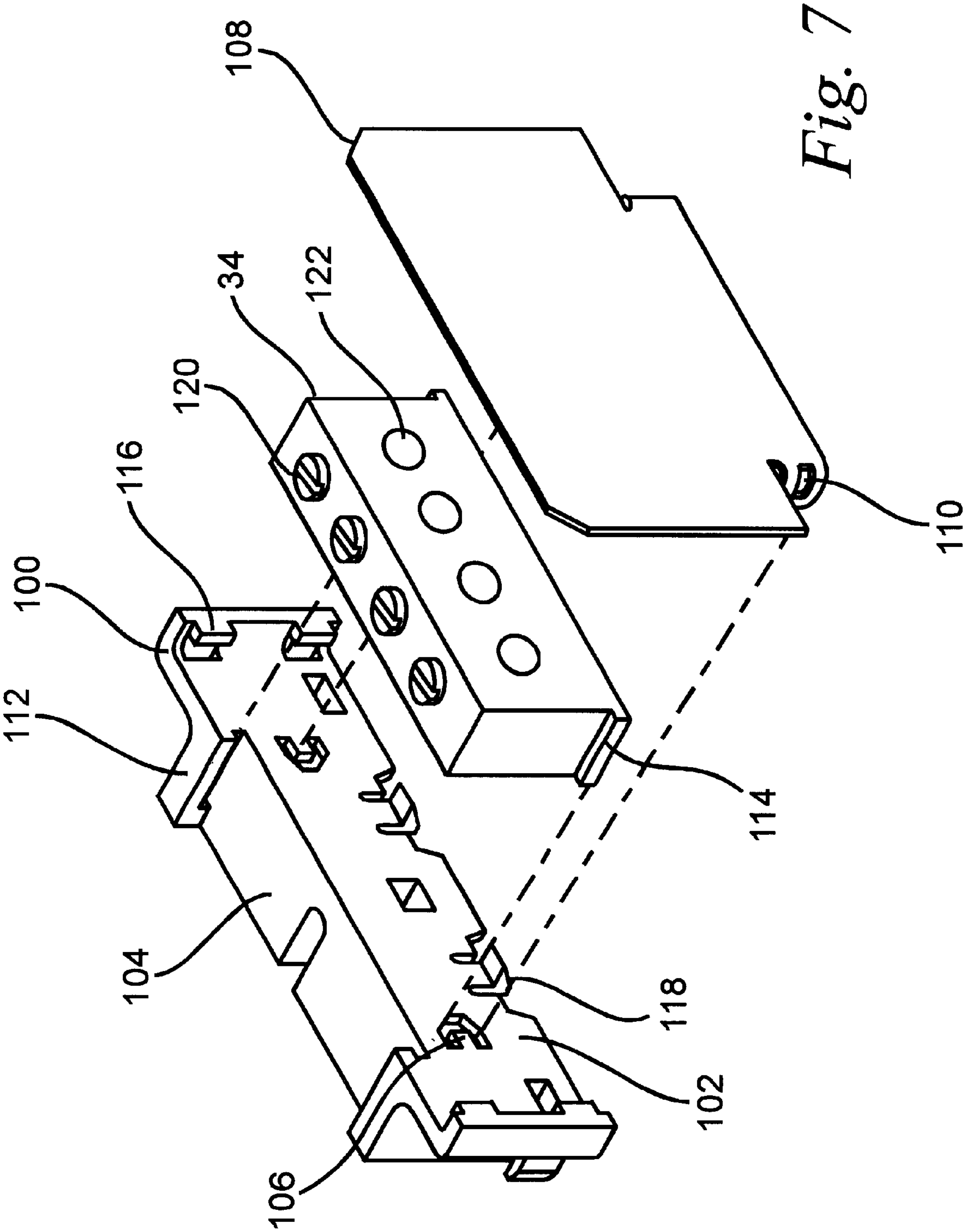
FIG. 7 is an isolated, exploded perspective view of a neutral base component of the present invention.

The present invention also includes an interior assembly 26 wherein the neutral bar 34 is part of a separate component or neutral base until snapped-into one or several optional positions on the support base 28 to provide an extension of the mounting surface 30. A preferred embodiment of the neutral base 100 is illustrated in FIG. 7. The neutral base 100 has a side face 102 and a top face 104. Recessed prongs 106 are integrally formed with the side face 102. The recessed prongs 106 provide means for fastening the neutral base 100 to the neutral bar 34 and an insulator 108 with a snap-fit relationship to corresponding edges defining apertures 110 in the insulator 108. The neutral base 100 includes a pair of offset flanges 112 located parallel to the top face 104 in an offset position sufficiently large to accommodate a corresponding edge 114 of the neutral bar 34. The neutral base 100 also includes the flanges 116 and prongs 118 parallel to the side face 102 for engaging the support base and extending the mounting surface of the interior assembly 26.

The neutral bar 34 includes a plurality of lugs 120 and openings 122 which provide electrical connections by crimping the ends of wires inserted into the openings 122 between the lug 120 and the body of the neutral bar 34. The edge 114 corresponds in size to the offset flanges 112 to slide underneath and be retained thereby.

The insulator 108 is subsequently attached to the neutral base 100 by the snap-fit relationship between the edges of apertures 110 and the recessed prongs 106. As a result, the neutral bar 34 is also retained in positioned with the neutral base 100. The flanges 116 and prongs 118 of the neutral base can then engage an adjacent module for final assembly without discrete fasteners. The insulator 108 is integrally formed of known insulating material such as the thermoplastic sold by the General Electric Company under the name Valox 420 or 750.

Figure 8:
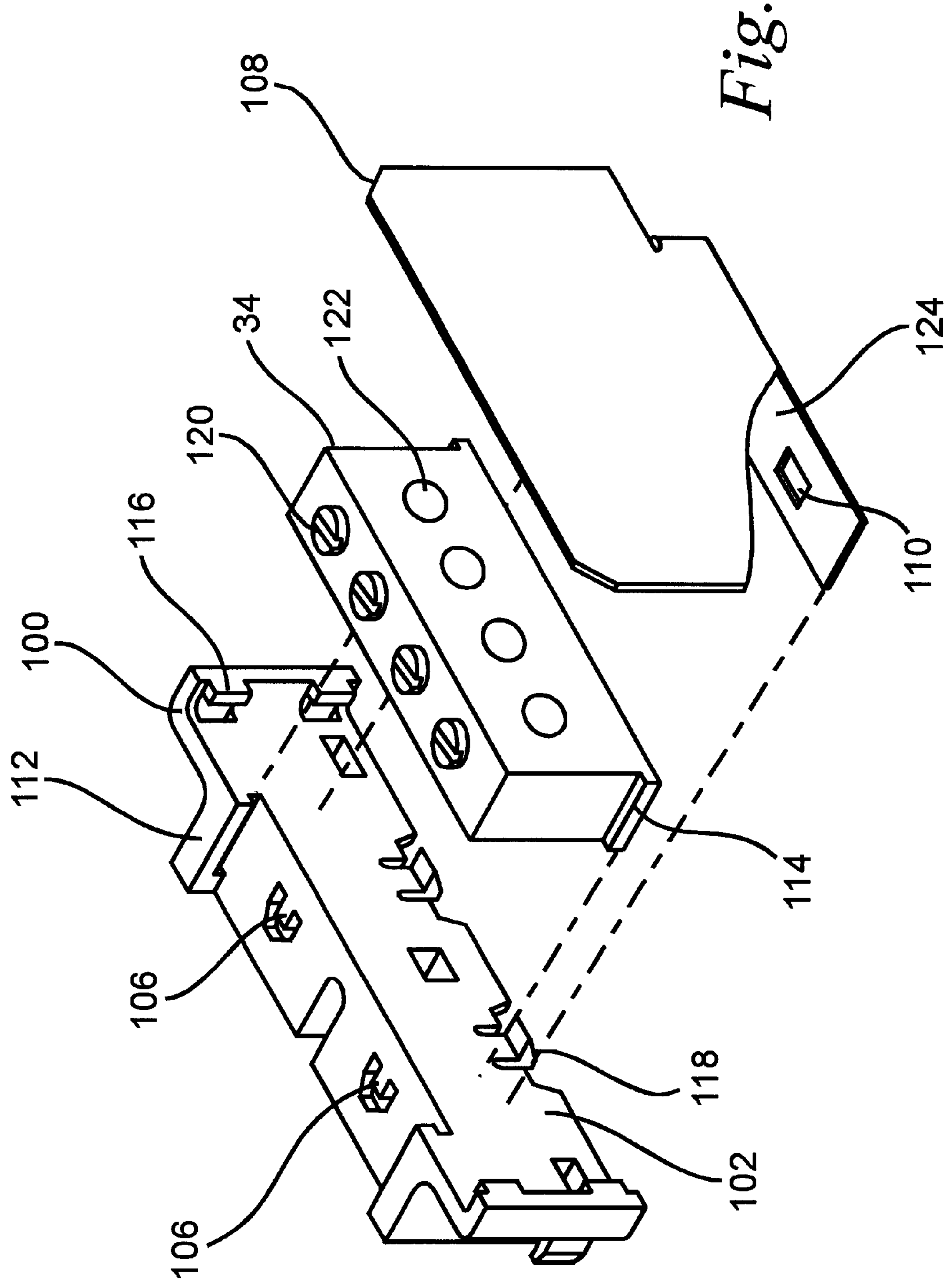
FIG. 8 is an isolated, exploded perspective view of a neutral base component of the present invention.

Another embodiment of the neutral base 100 is illustrated in FIG. 8 to provide other examples of means for fastening the neutral base 100, neutral bar 34, and the insulator 108 together without discrete fasteners. The neutral base 100 has a side face 102 and a top face 104. Recessed prongs 106 are integrally formed with the top face 104. The recessed prongs 106 provide means for fastening the neutral base 100 to the neutral bar 34 and an insulator 108 with a snap-fit relationship to corresponding apertures 110 located on a right angle flange 124 formed with the insulator 108. The neutral base 100 includes a pair of offset flanges 112 located parallel to the top face 104 in an offset position sufficiently large to accommodate both the corresponding edge 114 of the neutral bar 34 and the right angle flange 124 of the insulator. The neutral base 100 also includes the flanges 116 and prongs 118 parallel to the side face 102 and for engaging the support base 28 of the interior assembly 26.

The neutral bar 34 is first attached to the neutral base 100 by sliding the edge 114 underneath the offset flanges 112. The insulator 108 is subsequently attached to the neutral base 100 by sliding the right angle flange 124 underneath both the neutral bar 34 and the offset flanges 112 of the neutral base until the snap-fit relationship between the edges defining apertures 110 and the recessed prongs 106 engages. As a result, the neutral bar 34 is also retained in positioned with the neutral base 100.

Figure 9:
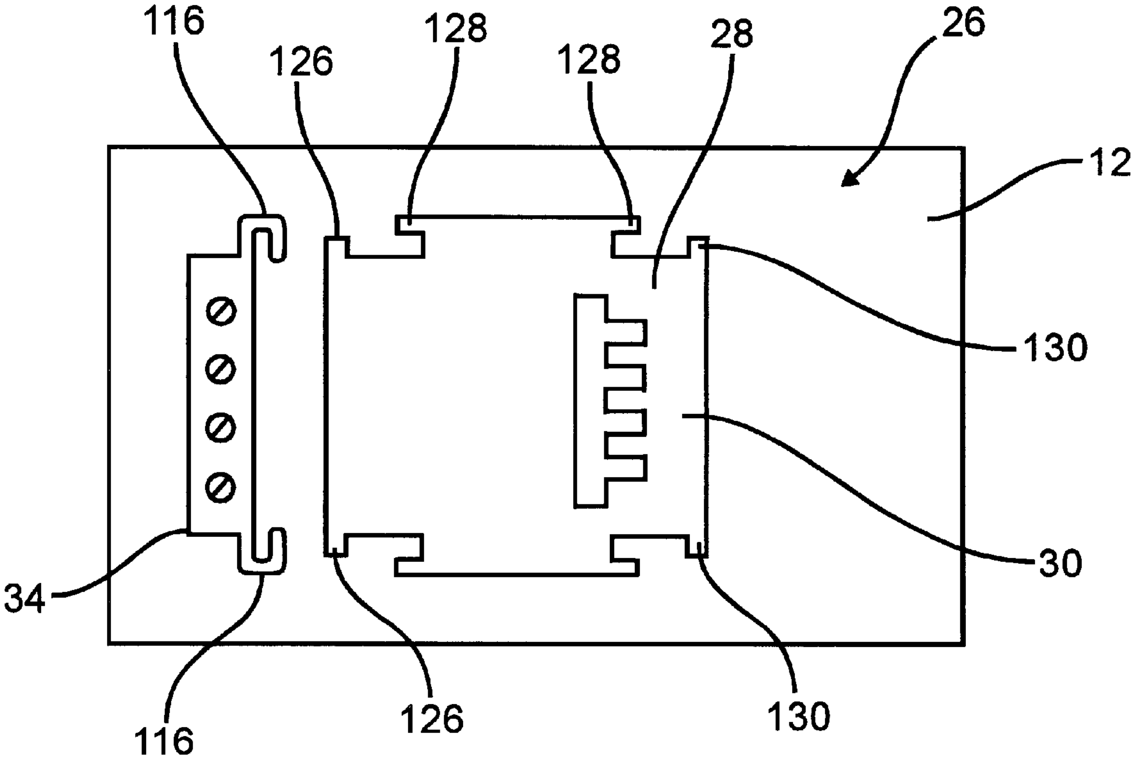
FIG. 9 is an isolated top view of the interior assembly with a support base configured to attach to the neutral bases of FIGS. 7 and 8.

Referring to FIG. 9, the flanges 116 of the neutral base 100 engage corresponding prongs 126 located on the support base 28. As the flanges slide over the corresponding prongs 126 the recessed prongs 118 seen in FIGS. 7 and 8 lock the neutral base into position. With the neutral base 100 connected to the support base 28, the mounting surface 30 is effectively enlarged and the neutral bar 34 and the bus bar 32 are still mounted in the same plane and on the same surface as described before.

FIG. 9 also illustrates that the neutral bar 34 can be mounted in different configurations relative to the bus bar 32 while still being on the same surface. A second set of prongs 128 can alternatively attach to the neutral base 100. This positions the neutral bar 34 and bus bar 32 in a back-to-back and parallel arrangement. A third set of prongs 130 alternatively attaches the neutral base 100 in a generally perpendicular configuration to the bus bar 32. These alternate configurations are illustrated for example and not for limitation as to the other neutral bar-bus bar configurations rendered possible by the present invention.

Figure 10:
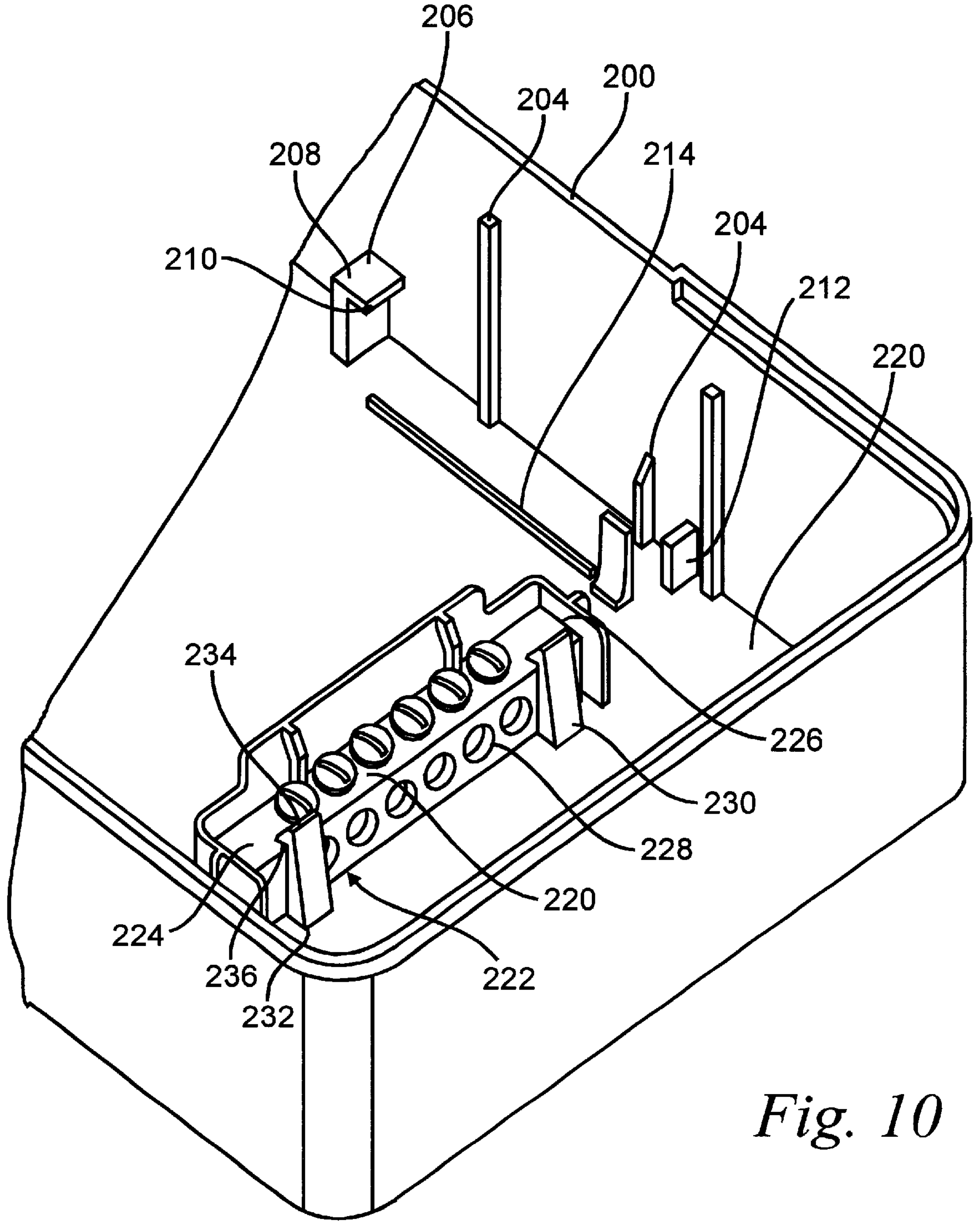
FIG. 10 is a partial perspective view of a mounting surface of a load center interior assembly illustrating two additional embodiments for mounting a connector using a snap-fit relationship.

FIG. 10 illustrates two additional combinations of the inventive features previously shown and described herein. The mounting surface 200 of the interior assembly supports a first upstanding wall 202 having ribs 204 mounted on one face. A second upstanding wall 206 includes a top end 208 extending away from the mounting surface, the top end having a flange 210 extending perpendicularly toward the connector for partially overlapping the top wall of the connector when the bottom wall seats on the mounting surface. A third upstanding wall 212 is integrally formed with the mounting surface, the second and third upstanding walls 210, 212 being spaced apart and adapted to abut opposing side walls of the connector therebetween so as to prevent movement in two opposing horizontal directions. The support base further includes a retaining wall 214 integrally formed with the mounting surface, the retaining wall 214 is adapted to abut a portion of the front face of the connector so as to prevent movement in at least one direction horizontally and not obstruct the connection of the circuit to the front face.

FIG. 10 also illustrates a connector 220 for connecting the electrical distribution device to a circuit. The connector 220 includes a bottom wall 222, a top wall 224, and side walls 226, one of the side walls of the connector defining a front face 228 for receiving one or more circuit connections thereto. A pair of interlocking prongs 230 each have an elongated body with one end 232 integrally formed with the mounting surface 200 and an opposite end 234 upstanding therefrom. The elongated body of each interlocking prong 230 has one side adapted to abut the front face 228 of the connector so as to prevent movement in the remaining horizontal direction. The opposite end 234 of each interlocking prong having an undercut 236 which allows the opposite end to overlap the top wall 224 of the connector so as to prevent movement in the vertical direction. Each interlocking prong 230 is made of a resilient material allowing the opposite end to temporarily deform away from the front face 228 until the top wall 224 engages the undercut when the bottom wall seats on the mounting surface.

The advantages of the modular load center assembly are readily demonstrated. The neutral base 34 creates a rigid connection with the mounting surface 28 to customize a multi-circuit interior assembly. The present invention can customize the interior assembly to accommodate tandem or two-circuit type circuit breakers with an appropriately sized neutral bar. The present invention also allows a retrofit expansion of an interior assembly which is already in the field since the original panel support need not be disturbed to change the neutral bar or bus bar(s).

In operation, the interior assembly of an electrical distribution device is assembled by upstanding a plurality of projections from the mounting surface; abutting the side walls of the neutral bar against the projections so as to prevent movement in at least one direction horizontally; upstanding at least one interlocking prong from the mounting surface, each interlocking prong having an undercut between the mounting surface and the end of the prong to define a retaining flange; abutting one or more side walls of the neutral bar with the interlocking prong so as to prevent movement in the vertical direction and the remaining horizontal directions; and, manually inserting without discrete fasteners the neutral bar between the upstanding projections and the interlocking prong to rest on the mounting surface of the interior assembly.

The compact design of the neutral bar and bus bar arrangement of the present invention allows the use of six branch circuits in an enclosure originally made for four or, at most, five branch circuits. Furthermore, even with the more compact design the neutral bar and bus bar arc assembled with convention tools, if any.

The present invention is preferably used with circuit breakers of the type manufactured by The Square D Company and identified as models QO and HOM (registered trademarks of The Square D Company) which are, for example, particularly useful in recreational vehicle applications. One of the advantages of the inventive load center is the capability to use both single and tandem circuit breakers without changing the dimensions of the enclosure. It should be understood, however, that circuit breakers having a different rating can be used in the inventive load center by modifying the dimensions of the panel board support and the configuration of the neutral bar and bus bar used thereon.

While particular embodiments and applications of the present applications of the present invention have been illustrated and described, it is to be understood that the invention is not limited to the precise construction disclosed herein and that various modifications, changes, and variations will be apparent to those skilled in the art may be made in the arrangement, operation, and details of construction of the invention disclosed herein without departing from the spirit and scope of the invention as defined in the appended claims.

What is claimed is:

1. A support base for an interior assembly of an electrical distribution device, the support base comprising:

at least one connector for connecting the electrical distribution device to a circuit, each connector having a bottom wall, a top wall, and side walls, one of the side walls of the connector defining a front face for receiving one or more circuit connections thereto;

a generally planar body defining a mounting surface abutting the bottom wall of each connector thereon;

a first upstanding wall integrally formed with the mounting surface, the first upstanding wall abutting a substantial portion of the side wall of the connector opposite the front face so as to prevent movement in at least one direction horizontally;

a second and third upstanding wall integrally formed with the mounting surface, the second and third upstanding walls being spaced apart and abutting opposing side walls of the connector therebetween so as to prevent movement in two opposing horizontal directions; and at least one interlocking prong having an elongated body with one end integrally formed with the mounting surface and an opposite end upstanding therefrom, the elongated body of each interlocking prong having one side abutting the front face of the connector so as to prevent movement in the remaining horizontal direction, the opposite end of each interlocking prong having an undercut which allows the opposite end to overlap the top wall of the connector so as to prevent movement in the vertical direction, each interlocking prong made of a resilient material allowing the opposite end to temporarily deform away from the front face until the top wall engages the undercut when the bottom wall seats on the mounting surface.

2. The support base of claim 1 wherein the first upstanding wall is further defined by two ends positioned near the second and third walls and a top end extending away from the mounting surface, at each end of the first upstanding wall the top end is cut away below the top wall of the connector when the connector is seated on the mounting surface so as to leave a portion of the connector not abutting the first upstanding wall.

3. The support base of claim 1 wherein the first upstanding wall is further defined by two ends positioned near the second and third walls, each end of the first upstanding wall having an offset spaced away from the side wall of the connector opposite the front face so as to leave a portion of the connector not abutting the first upstanding wall.

4. The support base of claim 1 wherein the first upstanding wall is further defined by a plurality of ribs integrally formed on and rising above a face of the first upstanding wall so that the ribs are adapted to abut the side wall of the connector opposite the front face of the connector leaving a portion of the connector between the ribs not abutting the first upstanding wall.

5. The support base of claim 4 wherein the first upstanding wall is further defined by two ends positioned near the second and third walls and a top end extending away from the mounting surface, one of the ribs positioned at each end of the first upstanding wall extending perpendicularly downward from the top end.

6. The support base of claim 1 wherein the first upstanding wall is further defined by two ends integrally formed with the second and third walls.

7. The support base of claim 1 wherein the first upstanding wall is further defined by two ends positioned near the second and third walls, at least one of the interlocking prongs positioned across each end of the first upstanding wall.

8. The support base of claim 1 wherein the support base further includes a retaining wall integrally formed with the mounting surface, the retaining wall adapted to abut a portion of the front face of the connector so as to prevent movement in at least one direction horizontally and not obstruct the connection of the circuit to the front face.

9. The support base of claim 1 wherein the second upstanding wall includes a top end extending away from the mounting surface, the top end having a flange extending perpendicularly toward the connector for partially overlapping the top wall of the connector when the bottom wall seats on the mounting surface.

10. A neutral base for an interior assembly of an electrical distribution device, the interior assembly having an assembly mounting surface, the neutral base comprising:

a connector and a shield for making an electrical connection to a circuit, the shield having at least one mounting aperture thereon, the connector having a bottom wall, a top wall, and side walls, one of the side walls of the connector defining a front face for receiving one or more circuit connections thereto, two opposing side walls each having a mounting edge extending outwardly therefrom;

a first mounting surface defined between two ends of the base, each end having an offset flange upstanding from the first mounting surface to define a channel within each offset flange, each channel being closed at one end, each channel receiving one of the mounting edges of the connector so as to prevent movement in the vertical direction and three horizontal directions, each channel having an opposite end abutting the shield so as to prevent movement of the connector in the remaining horizontal direction, at least one interlocking prong having an elongated body with one end integrally formed with the base and an opposite end upstanding therefrom, the opposite end of each interlocking prong having an undercut engaging one of the mounting apertures on the shield, each interlocking prong made of a resilient material allowing the opposite end to temporarily deform away from the mounting aperture until the shield abuts the opposite end of channel; and a second mounting surface for securing the base to the mounting surface of the interior assembly.

11. A support base for an interior assembly of an electrical distribution device, the support base comprising:

at least one connector for connecting the electrical distribution device to a circuit, each connector having a bottom wall, a top wall, and side walls, one of the side walls of the connector defining a front face for receiving one or more circuit connections thereto;

a generally planar body defining a mounting surface adapted for abutting the bottom wall of each connector thereon;

a first upstanding wall integrally formed with the mounting surface, the first upstanding wall abutting a substantial portion of the side wall of the connector opposite the front face so as to prevent movement in at least one direction horizontally;

a second upstanding wall integrally formed with the mounting surface, the second upstanding wall being spaced perpendicular to the first upstanding wall and abutting one of the opposing side walls of the connector, the second upstanding wall having a top end extending away from the mounting surface, the top end having a flange extending perpendicularly toward the connector for partially overlapping the top wall of the connector when the bottom wall seats on the mounting surface;

a retaining wall integrally formed with the mounting surface, the retaining wall abutting a portion of the front face of the connector so as to prevent movement in at least one direction horizontally and not obstruct the connection of the circuit to the front face; and at least one interlocking prong having an elongated body with one end integrally formed with the mounting surface and an opposite end upstanding therefrom, the elongated body of each interlocking prong having one side abutting one of the opposing side walls so as to prevent movement in the remaining horizontal direction, the opposite end of each interlocking prong having an undercut which allows the opposite end to overlap the top wall of the connector so as to prevent movement in the vertical direction, each interlocking prong made of a resilient material allowing the opposite end to temporarily deform away from one of the opposing side walls until the top wall engages the undercut when the bottom wall seats on the mounting surface.

12. The support base of claim 11 wherein the first upstanding wall is further defined by a plurality of ribs integrally formed on and rising above a face of the first upstanding wall so that the ribs are adapted to abut the side wall of the connector opposite the front face of the connector leaving a portion of the connector between the ribs not abutting the first upstanding wall.

13. The support base of claim 12 wherein the first upstanding wall is further defined by two ends positioned near the second and third walls and a top end extending away from the mounting surface, one of the ribs positioned at each end of the first upstanding wall extending perpendicularly downward from the top end.

* * * * *